United States Patent
Orus Lacort et al.

(10) Patent No.: US 12,373,383 B2
(45) Date of Patent: Jul. 29, 2025

(54) SCALABLE COMPUTER ARCHITECTURAL FRAMEWORK FOR QUANTUM OR CLASSICAL DIGITAL COMPUTERS

(71) Applicant: MULTIVERSE COMPUTING SL, Donostia (ES)

(72) Inventors: Roman Oscar Orus Lacort, Donostia (ES); Samuel Mugel, Toronto (CA)

(73) Assignee: MULTIVERSE COMPUTING SL, Donostia (ES)

( * ) Notice: Subject to any disclaimer, the term of this patent is extended or adjusted under 35 U.S.C. 154(b) by 883 days.

(21) Appl. No.: 17/566,271

(22) Filed: Dec. 30, 2021

(65) Prior Publication Data

US 2023/0205728 A1     Jun. 29, 2023

(30) Foreign Application Priority Data

Dec. 23, 2021  (EP) .................................... 21383211

(51) Int. Cl.
*G06N 10/40* (2022.01)
*G06F 15/80* (2006.01)

(52) U.S. Cl.
CPC ............. *G06F 15/80* (2013.01); *G06N 10/40* (2022.01)

(58) Field of Classification Search
None
See application file for complete search history.

(56) References Cited

U.S. PATENT DOCUMENTS

| 8,063,657 | B2 * | 11/2011 | Rose ...................... G06N 10/40 326/47 |
| 11,157,817 | B2 | 10/2021 | Rolfe | |
| 11,694,108 | B2 * | 7/2023 | Tezak ..................... G06N 20/10 703/14 |

(Continued)

FOREIGN PATENT DOCUMENTS

WO     2021237362 A1     12/2021

OTHER PUBLICATIONS

Arden B et al. : "Analysis of Chordal Ring Network", IEEE Transactions on Computers, col. C-30, No. 4, Apr. 1981, p. 291-295, DOI: 10.1109/TC.1981.1675777, Electronic ISSN: 1557-9956 (Year: 1981).*

(Continued)

*Primary Examiner* — Xuyang Xia
(74) *Attorney, Agent, or Firm* — Edell, Shapiro & Finnan, LLC

(57) ABSTRACT

Scalable computer architectural frameworks for quantum computers or for classical digital computers. According to one implementation, the framework includes a plurality of processing nodes, each processing node including at least three processing elements, and a plurality of couplings. The processing elements in a processing node (11) are connected in series forming a string comprising two end processing elements and at least one intermediate processing element. Each processing node is connected to each of the other processing nodes by means of only one external coupling. The intermediate processing elements are connected to processing elements of other processing nodes by the same number of external couplings, and the end processing elements are connected to processing elements of other processing nodes by the same number of external couplings or one more.

10 Claims, 6 Drawing Sheets

(56) References Cited

U.S. PATENT DOCUMENTS

| | | | |
|---|---|---|---|
| 12,175,222 B1* | 12/2024 | Benfield | G06N 3/048 |
| 2018/0246848 A1 | 8/2018 | Douglass et al. | |
| 2021/0117845 A1* | 4/2021 | Choi | G06N 10/40 |
| 2021/0289020 A1 | 9/2021 | Rolfe et al. | |

OTHER PUBLICATIONS

European Search Report, Application No. 21383211, Jun. 10, 2022, 11 pages.
Arden et al., "Analysis of Chordal Ring Network", Computer Structures Reading and Examples Fall Dept of Comput Sci., Jan. 1, 1971, 5 pages.

* cited by examiner

SCALABLE COMPUTER ARCHITECTURAL FRAMEWORK FOR QUANTUM OR CLASSICAL DIGITAL COMPUTERS

CROSS-REFERENCE TO RELATED APPLICATIONS

This application relates to and claims the benefit and priority to European Application No. EP21383211.6, filed Dec. 23, 2021.

TECHNICAL FIELD

The present invention relates to scalable computer architectural frameworks for quantum or classical digital computers.

BACKGROUND

Computer architectural frameworks are known, both for quantum computing and also for quantum inspired computing. One of the major challenges of these frameworks is providing an interconnection framework for its processing elements so that they can be as interconnected as possible.

US20170337155A1 describes a scalable computer architectural framework for quantum computers and classical digital computers. The framework has a plurality of quantum bits (qubits), some of them being top layer qubits and the rest being bottom layer qubits. Top layer qubits are connected with their neighbor top layer qubits with horizontal bonds and bottom layer qubits are connected to their neighbor bottom layer qubits with vertical bonds. These horizontal bonds and vertical bonds are regular lattice interconnects between qubits. The framework has a set of inhomogeneous interconnects or bonds provided between multiple qubits so as to increase a number of interconnects between the qubits in the computer. The inhomogeneous interconnects are provided for classical and quantum computers so as to allow an increase of functionality at reduced additional engineering cost, while enhancing overall computing efficiency by decreasing significantly average distance between qubits.

SUMMARY

Disclosed are scalable computer architectural frameworks for quantum or classical computers.

The scalable computer architectural framework for quantum computers or for classical digital computers of the invention comprises a plurality of processing nodes, each processing node comprising at least three processing elements, and a plurality of couplings, each coupling being configured to communicatively connect two processing elements.

The processing elements of each processing node are connected with each other by means of internal couplings, and the processing elements of different processing nodes are connected with each other by means of external couplings.

The processing elements in a processing node are connected in series forming a string, the string comprising two end processing elements and at least one intermediate processing element.

In the scalable computer architectural framework of the invention, each processing node is connected to each of the other processing nodes by means of only one external coupling, the intermediate processing elements of the processing nodes being connected to processing elements of other processing nodes by the same number of external couplings, and the end processing elements of the processing nodes being connected to processing elements of other processing nodes by said same number of external couplings or one external coupling more than said same number.

When designing an architecture for a quantum processor, or for simulating a quantum processor in a classical digital computer, there are two main factors that may be considered. The first one relates to the connectivity of each of the processing nodes of the computer architectural framework. The connectivity of a processing node is measured as the number of couplings each processing node has, this is, the number of processing nodes to which said processing node is directly connected to. The second one relates to the distance between two processing nodes, which is measured as the smallest number of couplings that must be traversed in order to go from one processing node to another, these couplings forming the shortest path between those two processing nodes.

The aim of all architectural frameworks is to provide a framework in which the distance between all processing nodes is minimized while keeping the connectivity of its processing nodes to a value low enough which enables the implementation of the framework. The framework of the invention fulfills this objective replacing each processing node by a set of processing elements that make up the processing node.

In the framework of the invention, the connectivity of each processing node is $N-1$, N being the number or processing nodes in the framework. However, the framework of the invention allows the connectivity of each processing element being highly reduced. The connectivity of each processing element depends on the number N of processing nodes in the framework, and on the number of processing elements in the processing nodes, such that, for the same number of processing nodes, the higher the number of processing elements, the lower the connectivity of each of said processing elements, and vice versa.

In the framework of the invention, all processing nodes are directly connected to the other processing nodes, as all processing nodes have a processing element directly connected to a processing element of every other processing node, so the distance between every two processing nodes is one. In the framework of the invention, when a computer operation between two processing elements has to be executed, the framework simplifies the process of identifying the shortest path between these two processing elements, such that the efficiency of the execution of the computer operation is highly improved.

For the previous reasons, the framework of the invention is highly scalable, as it allows the processing nodes of the framework being fully connected, while keeping both, the connectivity of the processing elements that form the processing nodes at a low value, and the distance between any two processing elements at a low value too.

DETAILED DESCRIPTION

FIGS. 1 to 4 show schematic illustrations of preferred embodiments of the scalable computer architectural framework 1 of the invention for quantum computers or for classical digital computers.

Classical digital computers use data encoded to binary digits (bits), which are in two different states (0 or 1). Instead, quantum computers use quantum bits (qubits), that can be in superposition of states. This is, a quantum computer uses qubits which can be a 1, or a 0, or both at the same time. The present invention solves the technical problem related to the design of hardware chips for quantum computation with qubits for which an all-to-all interaction is not natural. Non-limiting examples of these are superconducting qubits and quantum dots bits, as opposed to for example ion trap qubits and neutral atom qubits. One of the basic requirements to build hardware chips for quantum computation, is the ability to interconnect such qubits so that joint computer operations can be applied on them, as for example, two-qubit unitary quantum gates based on two-qubit interactions. The ability to have qubits in a hardware chip for quantum computation as connected as possible is therefore a basic step towards realistic and practical quantum computing.

Classical digital computers can be used to simulate a quantum computer. The present invention also provides a computer architectural framework to simulate quantum computing in a classical digital computer.

Figure 1:
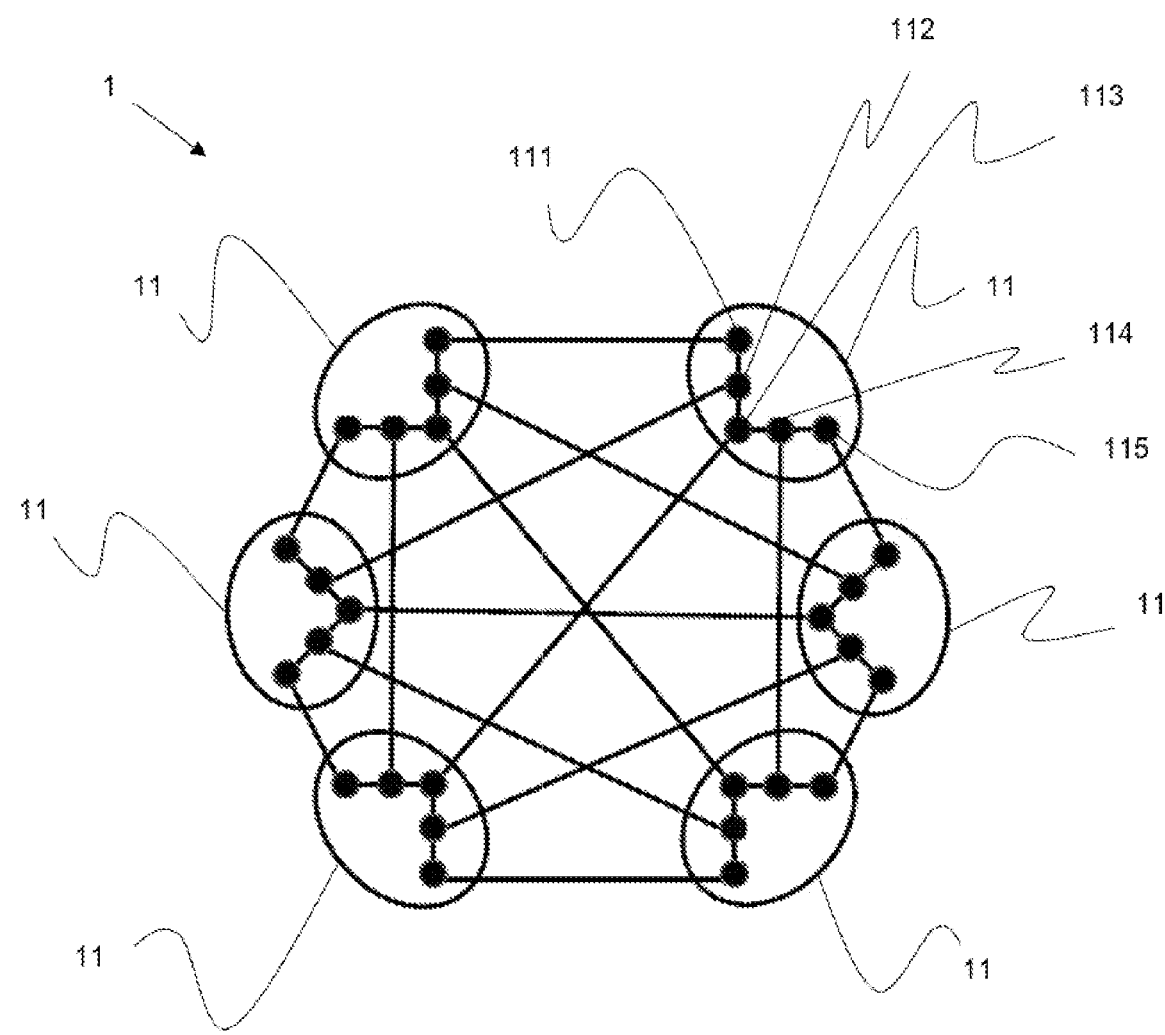
FIG. 1 shows a schematic illustration of a first embodiment of a scalable computer architectural framework for quantum computers or for classical digital computers.

The scalable computer architectural framework 1 for quantum computers or for classical digital computers of the preferred embodiment of FIG. 1 comprises a plurality of processing nodes 11, each processing node 11 comprising at least three processing elements, and a plurality of couplings, each coupling being configured to communicatively connect two processing elements.

The processing elements of each processing node 11 are connected with each other by means of internal couplings, and the processing elements of different processing nodes 11 are connected with each other by means of external couplings.

The processing elements in a processing node 11 are connected in series forming a string, the string comprising two end processing elements 111, 115 and at least one intermediate processing element 112, 113, 114.

In the scalable computer architectural framework 1 of the invention, as it is the case in the embodiment of FIG. 1, each processing node 11 is connected to each of the other processing nodes 11 by means of only one external coupling, the intermediate processing elements 112, 113, 114 of the processing nodes 11 being connected to processing elements 111 of other processing nodes 11 by the same number of external couplings (one in the embodiment of FIG. 1). The end processing elements 111, 115 of the processing nodes 11 may be connected to processing elements 111 of other processing nodes 11 by said same number of external couplings (as it is the case in the embodiment of FIG. 1) or one external coupling more than said same number (as shown for example in the embodiment of FIG. 2).

When designing a computer architectural framework for a quantum processor, or for simulating a quantum processor in a classical digital computer, there are two main factors that may be considered. The first one relates to the connectivity of each of the processing nodes of the computer architectural framework. The connectivity of a processing node is measured as the number of couplings each processing node has, this is, the number of processing nodes to which said processing node is directly connected to. The second one relates to the distance between two processing nodes, which is measured as the smallest number of couplings that must be traversed in order to go from one processing node to another, these couplings forming the shortest path between those two processing nodes.

The aim of all architectural frameworks is to provide a framework in which the distance between all processing nodes is minimized while keeping the connectivity of its processing nodes to a value low enough which enables the implementation of the framework. The framework of the invention fulfills this objective replacing each processing node by a set of processing elements that make up the processing node.

In the framework 1 of the invention, the connectivity of each processing node 11 is N−1, N being the number or processing nodes 11 in the framework. However, the framework 1 of the invention allows the connectivity of each processing element being highly reduced. The connectivity of each processing element depends on the number N of processing nodes 11 in the framework 1, and on the number of processing elements in the processing nodes 11, such that, for the same number of processing nodes 11, the higher the number of processing elements, the lower the connectivity of each of said processing elements, and vice versa.

When designing a computer architectural framework for a quantum processor, qubit connectivity is of particular relevance. In order for a quantum processor to perform sophisticated quantum operations, at least some of the qubits must be interconnected such that information (i.e. classical information and/or quantum information) may be shared therebetween. However, as the quantum computer has more and more qubits, it becomes impossible to implement a quantum computer in which all qubits are communicatively coupled to all qubits. In those cases, a first qubit can be communicated to a second qubit by means of another qubit, or by means of multiple qubits located between them.

In the framework 1 of the invention, all processing nodes 11 are directly connected to the other processing nodes 11, as all processing nodes 11 have a processing element directly connected to a processing element of all other processing nodes 11, so the distance between every two processing nodes 11 is one. In the framework 1 of the invention, when a computer operation between two processing elements has to be executed, the framework 1 simplifies the process of identifying the shortest path between these two processing elements, such that the efficiency of the execution of the computer operation is highly improved.

For the previous reasons, the framework 1 of the invention is highly scalable, as it allows the processing nodes 11 of the framework 1 being fully connected, while keeping both, the connectivity of the processing elements 111 that form the processing nodes 11 at a low value, and the distance between any two processing elements 111 at a low value too.

In the embodiment of the scalable computer architectural framework 1 of FIG. 1, the framework 1 comprises six processing nodes 11 each of the processing nodes 11 comprising five processing elements 111, 112 113, 114, 115 connected in series forming a string. The first processing element 111 of the processing node 11 is an end processing element which is communicatively connected to the processing element 112 after it in the string by means of one internal coupling. In the same way, the last processing element 115 of the processing node 11 is an end processing element which is communicatively connected to the processing element 114 before it in the string by means of one internal coupling. The rest of the processing elements 112, 113, 114 in the processing node 11 are intermediate processing elements which are communicatively connected by means of two internal couplings, such that each intermediate processing element 112, 113, 114 is connected with an internal coupling to the processing element before it, and with the other internal coupling to the processing element after it. As an example, processing element 112 is connected by means of an internal coupling to the processing element 111, and by means of another internal coupling to the processing element 113. Each processing node 11 is connected to each of the other processing nodes 11 by means of only one external coupling. In the embodiment shown in FIG. 1, the intermediate processing elements 112, 113, 114 and the end processing elements 111, 115 of the processing nodes 11 are connected to processing elements 111 of other processing nodes 11 by the same number of external couplings, said number being equal to one.

In the embodiment shown in FIG. 1, the connectivity of each processing node 11 is five, this is, N−1, N being the number of processing nodes 11 in the framework 1, which is six. However, the connectivity of each processing element 111 is highly reduced, the connectivity of each end processing element 111, 115 being two, and the connectivity of each intermediate processing element 112, 113, 114 being three. When a computer operation between two processing elements 111 has to be executed, the framework 1 of this embodiment simplifies the process of identifying the shortest path between these two processing elements 111. In case both processing elements 111 form part of the same processing node 11, the shortest path comprises the internal couplings between both processing elements. However, in case the processing elements belong to different processing nodes 11, the shortest path comprises the internal couplings between the first processing element and the processing element of its processing node 11 which is connected to the processing node 11 to which the second processing element belongs to, the external coupling between both processing nodes 11, and the internal couplings between the second processing element and the processing element of its processing node 11 which is connected to the processing node 11 to which the first processing element belongs to. In the embodiment shown in FIG. 1, when the processing elements belong to different processing nodes 11, the maximum length of the shortest path between both two processing elements is nine.

Figure 2:
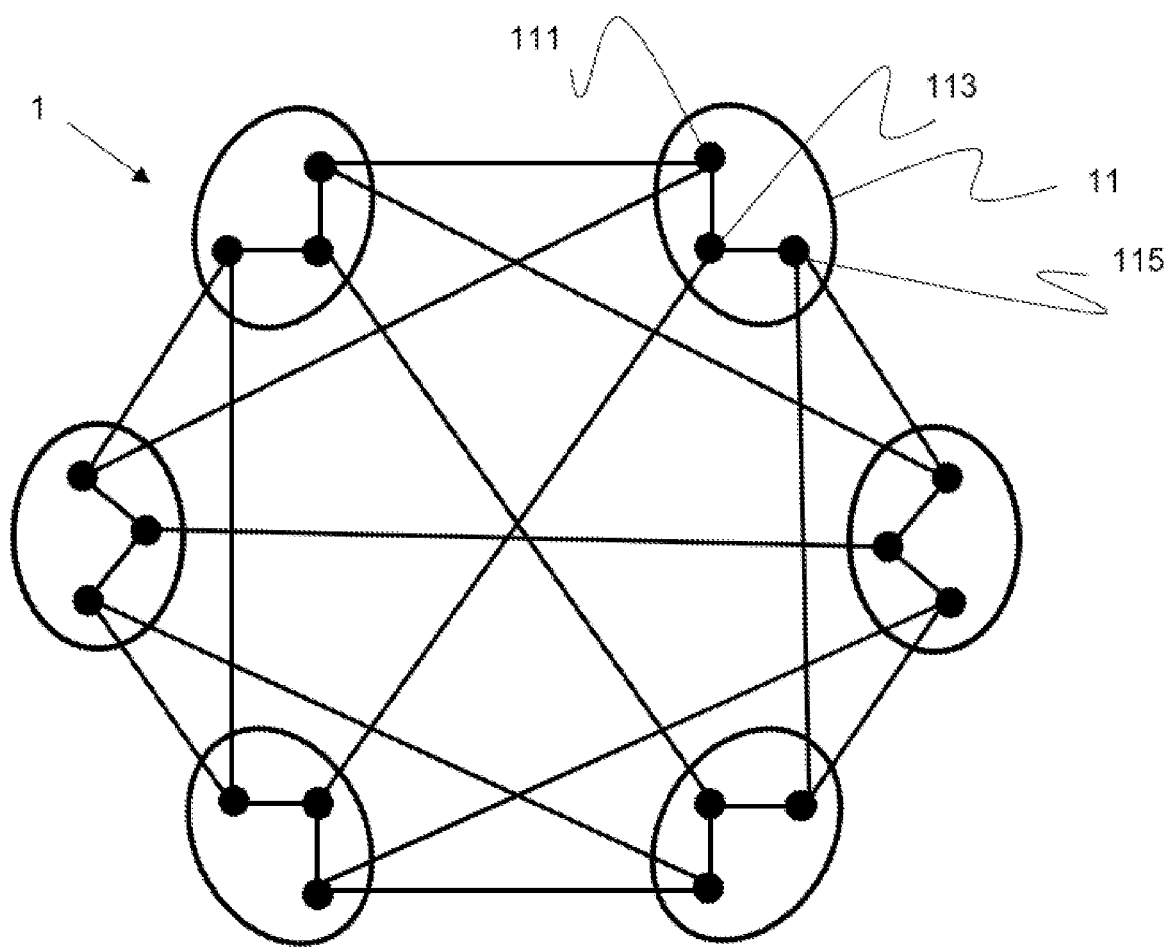
FIG. 2 shows a schematic illustration of a second embodiment of the scalable computer architectural framework for quantum computers or for classical digital computers.

FIG. 2 shows a schematic illustration of a second embodiment of the scalable computer architectural framework 1 of the invention for quantum computers or for classical digital computers. In this second embodiment, each intermediate processing element 113 of a processing node 11 is connected to processing elements of other processing nodes 11 by a number of external couplings (one), while each end processing element 111, 115 of a processing node 11 is connected to processing elements 111 of other processing nodes 11 by one external coupling more than said same number (two). In this second embodiment, the framework 1 also comprises six processing nodes 11, however each of the processing nodes 11 only comprises three processing elements 111, 113, 115 connected in series forming a string, processing elements 111, 115 being end processing elements and processing element 113 being an intermediate processing element. Intermediate processing element 113 is connected by means of an external coupling to a processing element 111 of another processing node 11, while end processing elements 111, 115 are connected by means of two external couplings each to processing elements 111 in other processing nodes 11. In this second embodiment, all processing elements 111 in a processing node 11 have the same number of couplings in total.

In the embodiment shown in FIG. 2, the connectivity of each processing node 11 is again five, this is, N−1, N being the number or processing nodes 11 in the framework 1, which is six. This means that processing nodes 11 are fully connected. However, the connectivity of each processing element is also highly reduced, the connectivity of all processing elements being three. In the same way, with the framework 1 of this second embodiment, the number of processing elements is also highly reduced compared to the first embodiment, because for the same number of N processing nodes 11 in the framework 1, each processing node 11 has two processing elements less, which simplifies the implementation of the framework 1. When a computer operation between two processing elements has to be executed, the framework 1 of the second embodiment also simplifies the process of identifying the shortest path between these two processing elements. Moreover, with the framework 1 of this second embodiment, the maximum length of the shortest path between two processing elements becomes smaller when compared with the first embodiment, the maximum length of the shortest path between two processing elements being five.

In an embodiment of the scalable computer architectural framework 1, all processing nodes 11 comprise the same number of processing elements 111. In the embodiments shown in FIG. 1 and FIG. 2, all processing nodes 11 have the same number of processing elements, this is, five processing elements in the embodiment of FIG. 1 and three processing elements in the embodiment of FIG. 2.

In an implementation of the scalable computer architectural framework 1, each intermediate processing element 112, 113, 114 is connected by means of one external coupling to a processing element 111 in another processing node 11. This is the case in the embodiments shown in FIG. 1 and FIG. 2.

In an implementation of the scalable computer architectural framework 1, the framework 1 comprises N processing nodes 11, N being an integer number bigger than three, and each processing node 11 has N−1 processing elements, each end processing element 111, 115 being connected by means of one external coupling to a processing element in another processing node 11. In the embodiment shown in FIG. 1, the number of processing nodes 11 N is equal to six, and each processing node 11 has N−1, this is five processing elements, end processing elements 111, 115 of each processing node 11 being connected by means of one external coupling to a processing element in another processing node 11. The framework 1 of this embodiment has the advantage of being a framework 1 very easy to implement, while at the same time keeping the connectivity of the processing elements at a low value, two for the end processing elements 111, 115, and three for the intermediate processing elements 112, 113, 114.

In an implementation of the scalable computer architectural framework 1, the framework 1 comprises N processing nodes 11, N being an integer number bigger than five, and each processing node 11 having N−3 processing elements, each end processing element 111, 115 being connected by means of two external couplings to two other processing nodes 11. In the embodiment shown in FIG. 2, the number of processing nodes 11 N is equal to six, and each processing node 11 has N−3, this is three processing elements, end processing elements 111, 115 of each processing node 11 being connected by means of two external couplings each to processing elements in other processing nodes 11. The framework 1 of this embodiment has the advantage of being a framework very easy to implement, in which the connectivity of all processing elements is equal to three, this is, a low value, and in which the number of processing elements is also highly reduced compared to the first embodiment, because for the same number of N processing nodes 11 in the framework 1, each processing node 11 has two processing elements less, which simplifies the implementation of the framework 1.

Figure 3:
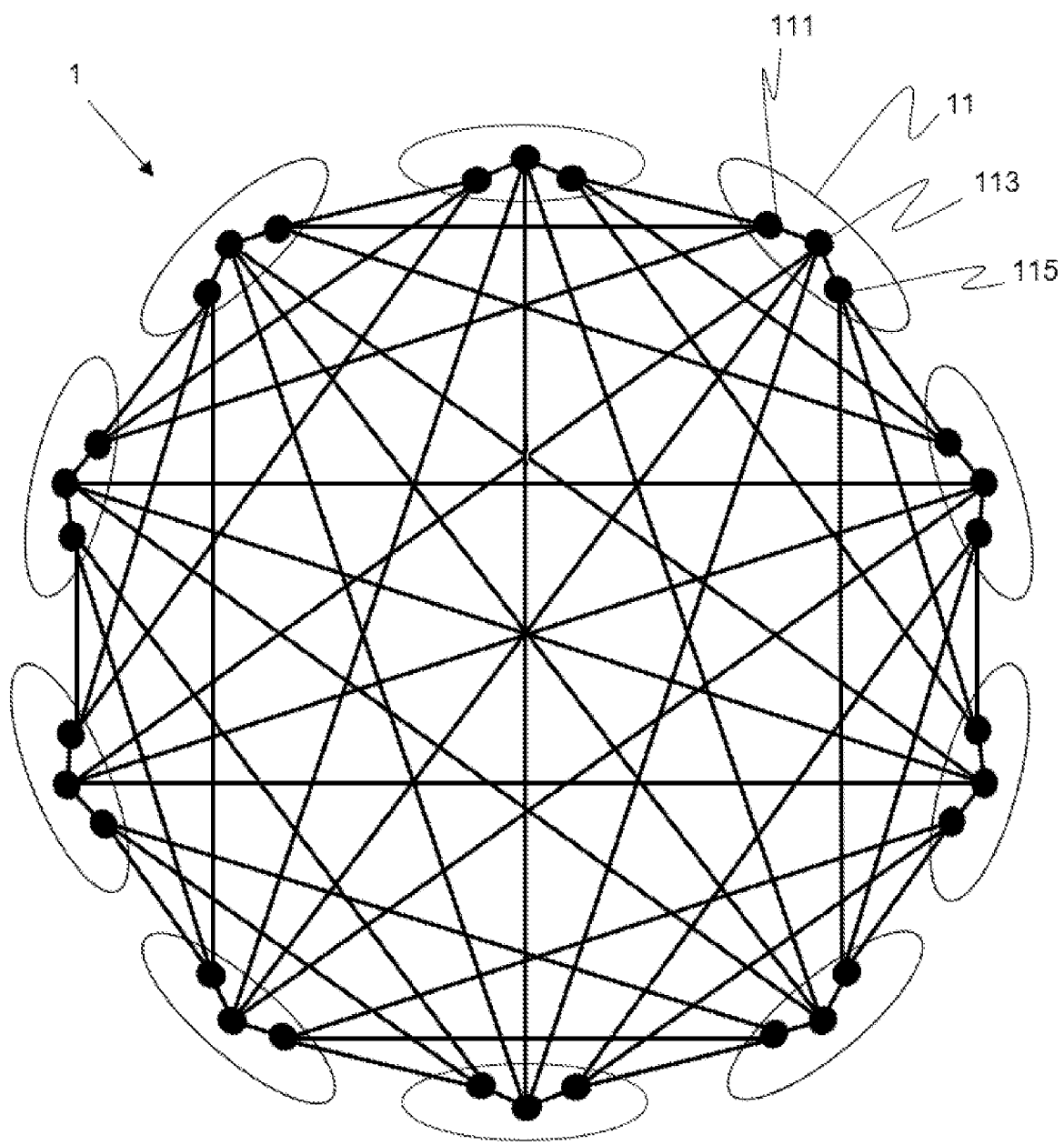
FIG. 3 shows a schematic illustration of a third embodiment of the scalable computer architectural framework for quantum computers or for classical digital computers.

In an implementation of the scalable computer architectural framework 1, each processing element 111 is connected by means of a plurality of external couplings to processing elements in other processing nodes 11. FIG. 3 shows a schematic illustration of a third embodiment of the scalable computer architectural framework 1 of the invention for quantum computers or for classical digital computers. In this third embodiment, each processing element 111 is connected by means of a plurality of external couplings (three) to processing elements 111 in other processing nodes 11.

In an implementation of the scalable computer architectural framework 1, the scalable computer architectural framework 1 comprises N processing nodes 11, N being an integer number bigger than six, each processing element being connected by means of n external couplings to processing elements in other nodes, such that intermediate processing elements 112, 113, 114 have n+2 couplings, and such that end processing elements 111, 115 have n+1 couplings, n being an integer number bigger than one, and each processing node 11 having e processing elements 111, e being an integer number bigger than two, such that for a known number n of external couplings per processing element, valid combinations for the number of processing nodes 11 N and the number of processing elements e are given by the following equation:

$$e = \frac{N-1}{n}$$

In the third embodiment of the scalable computer architectural framework 1 shown in FIG. 3, the scalable computer architectural framework 1 comprises ten processing nodes 11, all the processing elements 111, 113, 115 being connected by means of three external couplings to processing elements 111 in other nodes. In this third embodiment, intermediate processing elements 113 have five couplings, and end processing elements 111, 115 have four couplings in total.

In case the framework 1 has to be implemented with a different number of processing nodes 11 N, knowing the maximum number of external couplings that the technology at the moment of implementing the framework 1 allows, the formula shown above will provide a way to know how many processing elements will be needed in each processing node 11 for implementing the scalable computer architectural framework 1 of the invention.

In an implementation of the scalable computer architectural framework 1, the scalable computer architectural framework 1 comprises N processing nodes 11, N being an integer number bigger than eight, the processing elements being connected by means of k couplings to other processing elements, k being an integer number bigger than three, and each processing node 11 having e processing elements, e being and integer number bigger than two, such that for a known number k of couplings, valid combinations for the number of processing nodes 11 N and the number of processing elements e are given by the following equation:

$$e = \frac{N-3}{k-2}$$

Figure 4:
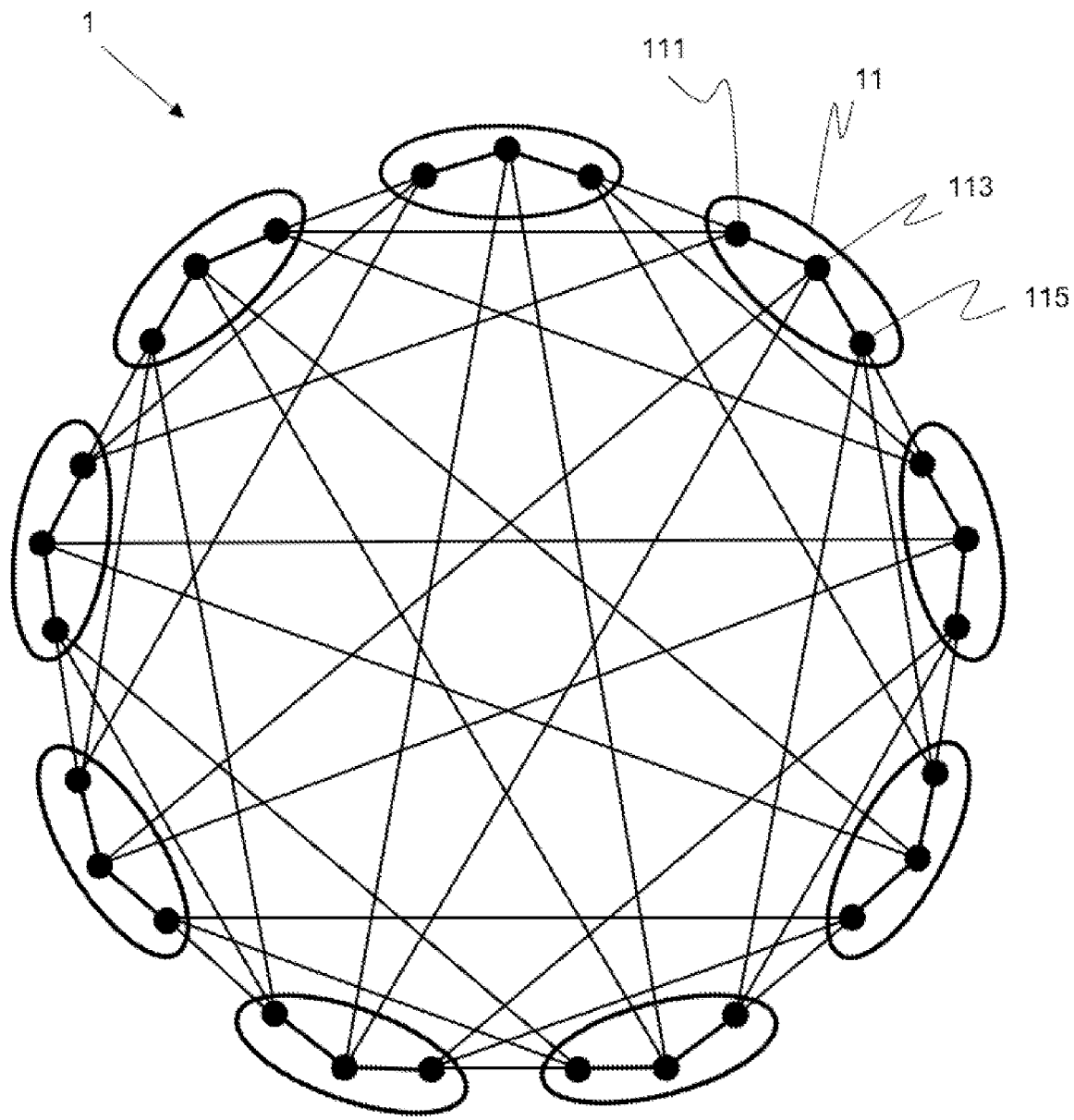
FIG. 4 shows a schematic illustration of a fourth embodiment of the scalable computer architectural framework for quantum computers or for classical digital computers.

FIG. 4 shows a fourth embodiment of the scalable computer architectural framework 1 of the invention. In this embodiment, the scalable computer architectural framework 1 comprises nine processing nodes 11, each processing element 111, 113, 115 being connected by means of four couplings to other processing elements. In this fourth embodiment, intermediate processing elements 113 have two external couplings, while end processing elements 111, 115 have three external couplings.

In case the framework 1 has to be implemented with a different number of processing nodes 11 N, knowing the maximum number of couplings that the technology at the moment of implementing the framework 1 allows, the formula shown above will provide a way to know how many processing elements 111 will be needed in each processing node 11, for implementing the scalable computer architectural framework 1 of the invention.

In an implementation of the scalable computer architectural framework 1, the scalable computer architectural framework 1 is a scalable computer architectural framework for a quantum computer, the processing nodes 11 being logical qubits, and the processing elements 111 being physical qubits. The framework 1 provides a topology of a network of fully connected logical qubits, while the connectivity of each of the physical qubits is considerably lower that the connectivity of each logical qubit. The way in which the quantum states of the physical qubits define the states of the logical qubit to which they belong can be chosen in a variety of ways known in the art. By construction, it is possible to implement quantum error-correcting codes in a natural way, which adds an extra layer of protection against errors and noise in the calculations. Gates and interactions between logical qubits are mediated by the physical qubits from each node that are correspondingly coupled, followed by computer operations within each processing node to adequate the overall state of the logical qubits. In the case of a quantum computer, internal couplings between processing elements 111 of a processing node 11 are couplings between physical qubits belonging to the same logical qubit, and external couplings between processing elements 111 are couplings between physical qubits belonging to different logical qubits.

Figure 5:
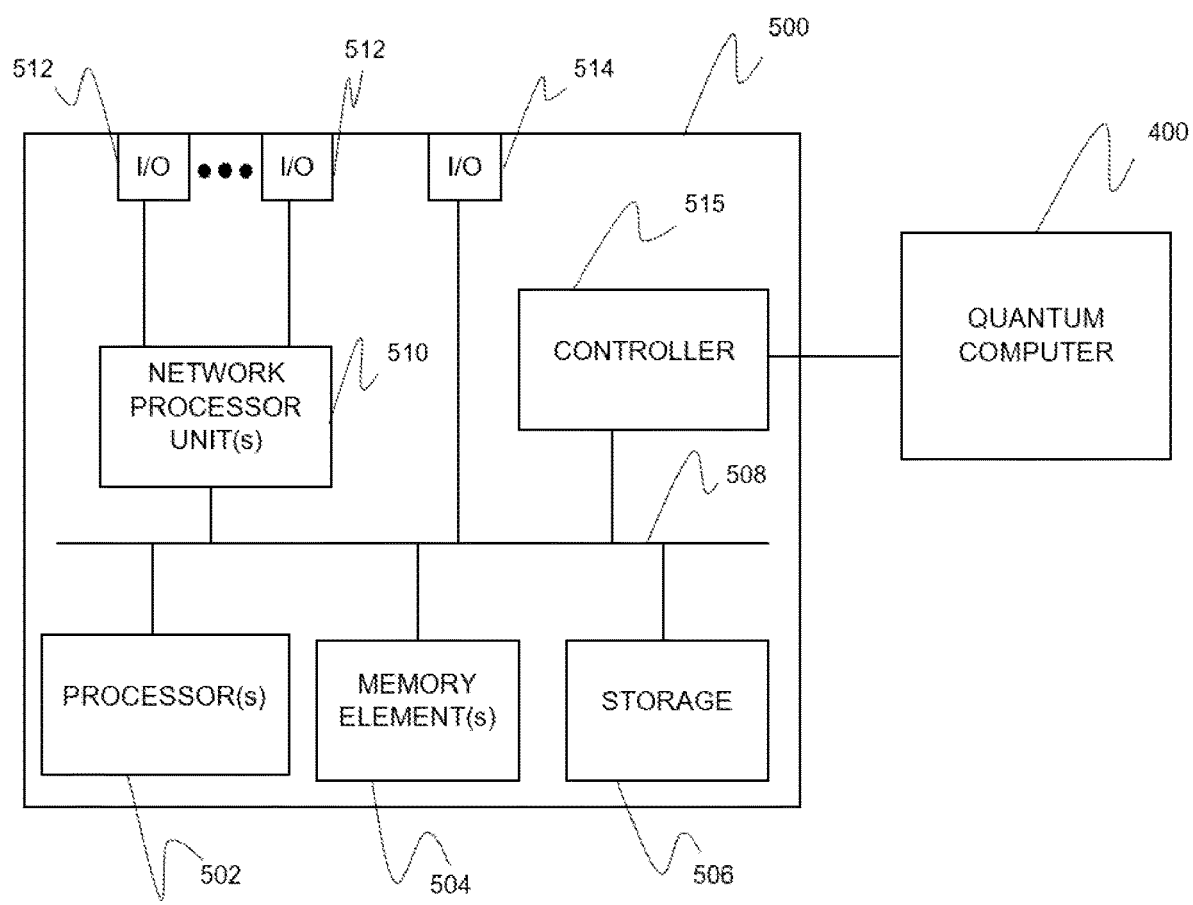
FIG. 5 shows a schematic representation of an embodiment of a quantum computer governed by a classical digital computer.

In FIG. 5, a schematic representation of an embodiment of a quantum computer 400 governed by a classical digital computer 500 is shown. In at least one embodiment of the classical digital computer 500 governing the quantum computer 400, the classical digital computer 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, a controller 515, control logic, and quantum computer controlling instructions. Quantum computer controlling instructions may, in various embodiments, be stored for classical digital computer 500 using any combination of memory element(s) 504 and/or storage 506. Quantum computer controlling instructions, when executed by processor 502 are configured for governing controller 515. Controller 515 is configured for generating one or more control signals that control the operation of quantum computer 400. Control signals may be electrical signals, magnetic signals, or other type of signals, such us optical signals.

Quantum computer 400 schematically represented in FIG. 5 comprises a quantum processor, the quantum processor comprising a plurality of qubits, such that one qubit is able to be entangled with another qubit. This entanglement between two qubits is achieved via one or more couplings. The present invention solves the technical problem related to the design of hardware chips for quantum processors with qubits for which an all-to-all interaction is not natural. The quantum computer 400 further comprises input components, these input components being electric, magnetic or optical components, among others, configured for inputting control signals into the quantum computer 400 for controlling the qubits and the couplings between qubits, and measurement components configured for reading the state of the qubits in the quantum processor.

In an implementation of the scalable computer architectural framework 1, the scalable computer architectural framework 1 is a scalable computer architectural framework for classical digital computers, the processing elements being tensors, and the scalable computer architectural framework 1 being a tensor network. Currently, tensor networks are being used to simulate complex quantum systems ("*Tensor networks for complex quantum systems*". Nature Reviews Physics. 1(9): 538-550. ISSN 2522-5820, 5 Aug. 2019), and also to simulate complex classical systems. The framework 1 of the invention allows the simulation of a quantum computer by means of a tensor network in which tensors mathematically describe the qubits and the couplings between said qubits in a quantum computer, and in which the couplings between the tensors represent bond dimensions of the tensor network that carry entanglement between the different (physical or logical qubits). The framework 1 of the invention provides a topology in which the tensors can be fully interconnected, allowing for a more precise mathematical representation of the quantum computer. The framework 1 of the invention allows the simulation of a quantum computer and/or the simulation of a complex classical data structure. As a non-limiting example, the framework 1 of the invention may also provide a suitable framework for a tensor network used to represents a complex data tensor with a high number of indices, providing this way a more precise mathematical representation for said complex classical data structure.

Figure 6:
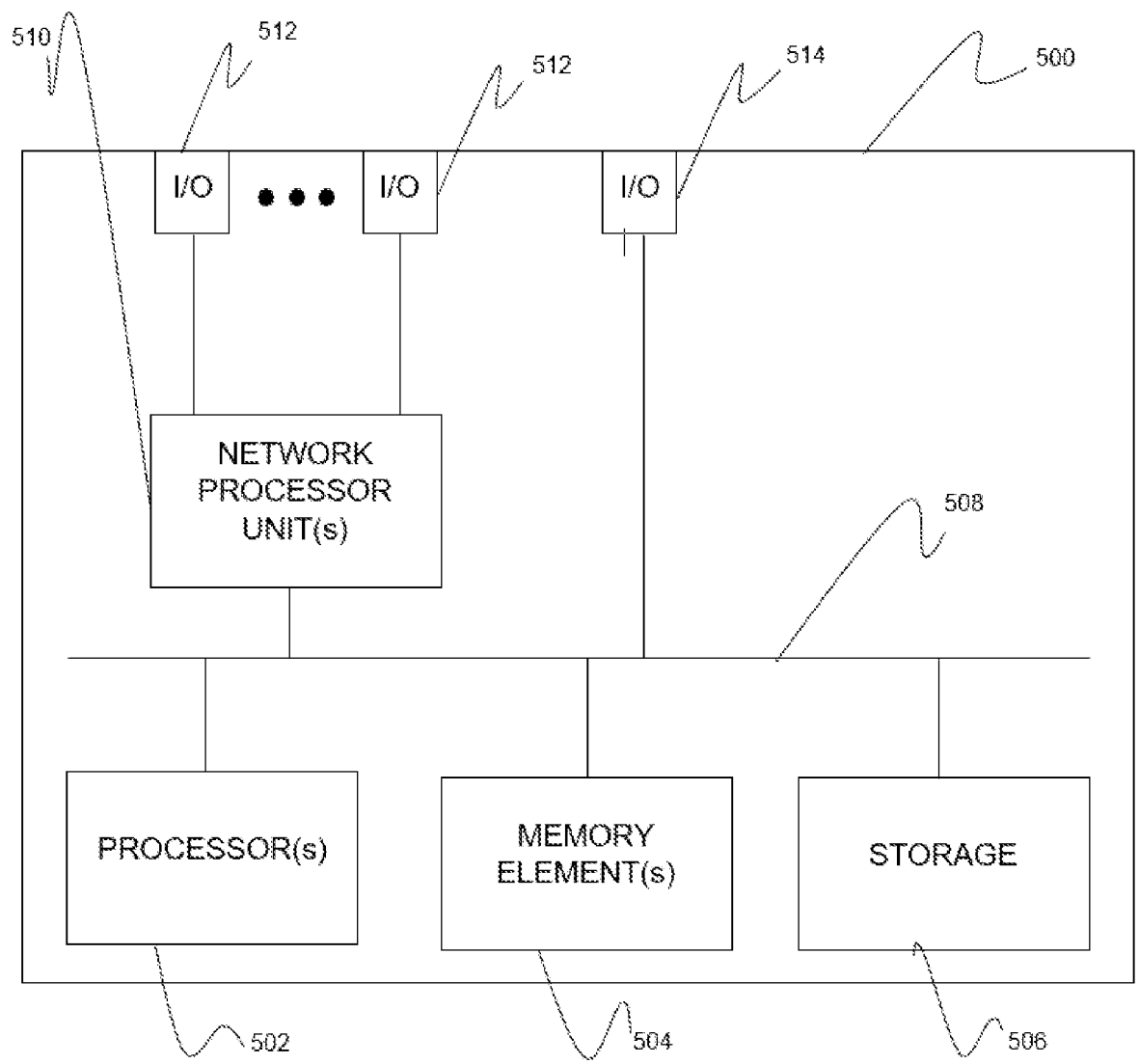
FIG. 6 shows a schematic representation of an embodiment of a classical digital computer.

In FIG. 6, a schematic representation of an embodiment of a classical digital computer 500 is shown. In at least one embodiment the classical digital computer 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic.

The technical features of the classical digital computer 500 that will be described below are also applicable to the classical digital computer 500 governing the quantum computer 400 of the embodiment of FIG. 4. These technical features have been omitted in that embodiment so as not to be repetitive.

In various embodiments, control logic may comprise instructions that, when executed, cause processor(s) 502 to perform operations, such us simulating complex quantum systems by means of tensor networks. In other embodiments, control logic can comprise instructions that, when executed, cause processor(s) 502 to perform operations which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In at least one embodiment, processor(s) 502 is/are at least one hardware processor configured to execute various tasks, operations and/or functions for classical digital computer 500 according to software and/or instructions configured for classical digital computer 500. Processor(s) 502 (e.g., a hardware processor) can execute any type of instructions associated with data to achieve the operations detailed herein. Any of potential microprocessors, digital signal processor, baseband signal processor, modem, PHY, controllers, systems, managers, logic, and/or machines can be construed as being encompassed within the broad term 'processor'.

In at least one embodiment, memory element(s) 504 and/or storage 506 is/are configured to store data, information, software, and/or instructions associated with classical digital computer 500, and/or logic configured for memory element(s) 504 and/or storage 506. For example, any logic described herein (e.g., control logic) can, in various embodiments, be stored for classical digital computer 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of classical digital computer 500 to communicate in order to exchange information and/or data. Bus 508 can be implemented with any architecture designed for passing control, data and/or information between processors, memory elements/storage, peripheral devices, and/or any other hardware and/or software components that may be configured for classical digital computer 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between classical digital computer 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between classical digital computer 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to classical digital computer 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

What is claimed is:

1. A scalable computer architectural framework for quantum computers or for classical digital computers, the framework comprising:
   a plurality of processing nodes, each of the plurality of processing nodes including at least three processing elements that are connected in series forming a string, the at least three processing elements including a first end processing element, a second end processing element and at least one intermediate processing element located in the string between the first and second processing elements;
   a plurality of couplings that is each configured to communicatively connect only two of the at least three processing elements, the plurality of couplings including internal couplings and external couplings, the internal couplings connecting the at least three processing elements of each processing node in series, the external couplings connecting processing elements that are located in different processing nodes;
   each processing node being connected to each of all the other processing nodes by only one external coupling;
   the at least one intermediate processing element of each processing node being connected to the at least three processing elements of other processing nodes by a number of external couplings, the number of external couplings being the same for all the intermediate processing elements; and
   each of the first and second end processing elements of each of the plurality of processing nodes being connected to the at least three processing elements of the other processing nodes by said same number of external couplings or one external coupling more than said same number.

2. The scalable computer architectural framework according to claim 1, wherein all of the plurality of processing nodes have the same number of processing elements.

3. The scalable computer architectural framework according to claim 2, wherein each intermediate processing element is connected by a single external coupling to a processing element in another processing node.

4. The scalable computer architectural framework according to claim 3, wherein the plurality of processing nodes comprises N processing nodes, N being an integer number greater than three, and each processing node having N−1 processing elements, each of the first and second end processing elements being connected by a single external coupling to a processing element in another processing node.

5. The scalable computer architectural framework according to claim 3, wherein the plurality of processing nodes comprises N processing nodes, N being an integer number greater than five, and each processing node having N−3 processing elements, each of the first and second end processing elements being connected by only two external couplings to two other processing nodes.

6. The scalable computer architectural framework according to claim 2, wherein each processing element is connected to two or more processing elements in other processing nodes by a respective two or more external couplings.

7. The scalable computer architectural framework according to claim 6, wherein the plurality of processing nodes comprises N processing nodes, N being an integer number greater than six, each processing element being connected by n external couplings to processing elements in other processing nodes, such that each of the intermediate processing elements have n+2 couplings, and such that each of the first and second end processing elements has n+1 couplings, n being an integer number greater than one, each processing node having e processing elements, e being an integer number greater than two.

8. The scalable computer architectural framework according to claim 6, wherein the plurality of processing nodes comprises N processing nodes, N being an integer number greater than eight, the processing elements being connected by means of k couplings to other processing elements, k being an integer number greater than three, and each processing node having e processing elements, e being an integer number greater than two.

9. The scalable computer architectural framework according to claim 1, wherein the scalable computer architectural framework is a scalable computer architectural framework for a quantum computer, the plurality of processing nodes being logical quantum bits, and the at least three processing elements being physical quantum bits.

10. The scalable computer architectural framework according to claim 1, wherein the scalable computer architectural framework is a scalable computer architectural framework for classical digital computers, the at least three processing elements being tensors, and the scalable computer architectural framework being a tensor network.

* * * * *